July 25, 1967 F. S. KING ET AL 3,332,421

COMBINATION SYRINGE AND VIAL MIXING CONTAINER

Filed Aug. 21, 1964

INVENTORS
MELVIN J. VISSER
FRANKLIN S. KING

BY

ATTORNEY

3,332,421
COMBINATION SYRINGE AND VIAL MIXING CONTAINER
Franklin S. King, Kalamazoo, and Melvin J. Visser, Portage, Mich., assignors to The Upjohn Company, Kalamazoo, Mich., a corporation of Delaware
Filed Aug. 21, 1964, Ser. No. 391,220
2 Claims. (Cl. 128—272)

This invention relates to containers and, more particularly, to compartmented containers for separate maintenance of materials prior to their use in combination.

Frequently it is desired to package in a single unit dry solids and a reconstituting diluent or separately maintained liquids for mixing prior to use, as in the separate storage of sterile components of a mixture to be injected into the human or animal body. Much attention has been accorded the development of such packages for the pharmaceutical industry in recent years. Various combinations of multiple-compartmented injection units have in fact been developed, but results thus far have proved unsatisfactory for one or more of a variety of reasons which the containers of this invention are designed to overcome.

The device of this invention is remarkably simple in construction and economical to fabricate and fill. More important, however, is the provision of a unit embodying components with which the physician is already familiar. Where reconstitution or mixing of ingredients is necessary prior to use he is thus enabled to respond in emergencies without time-consuming reflection on mechanics of operation. In this respect the device hereof, with unique coaction between its basic elements, is a departure from compartmented injection devices of the art, which may demonstrate remarkable ingenuity but too often involve costly or complicated features that detract from their practical usefulness.

The device of this invention comprises essentially means defining a mixing chamber for containing a first sterile ingredient for injection, said means being removably secured to a means defining a storage chamber for containing a second sterile fluid ingredient for injection. A penetrable sleeve closure seals the open upper end of the mixing chamber. A cannula or needle is mounted in the storage chamber and extends into the mixing chamber within the sleeve closure. The penetrable sleeve closure receives the lower portion of the storage chamber, seals the upper end of the mixing chamber, and envelops the cannula. The storage chamber carries a plunger and piston slidable therein. Withdrawal of the storage chamber and cannula from the mixing chamber and re-insertion of the cannula through the wall of the penetrable sleeve closure intermediate its length affords communication between the storage of the mixing chambers, permitting the fluid ingredient of the storage chamber to be expelled into the mixing chamber by downward movement of the plunger and piston in the storage chamber. With the fluid ingredient now in the mixing chamber, which already contains the first sterile ingredient for injection, the ingredients are intermixed and the resulting mixture withdrawn as for use.

In its preferred embodiment the device of this invention comprises a mixing vial containing a first sterile ingredient for injection atop of which is positioned a syringe containing a second sterile fluid ingredient, such as diluent, for injection. The cannula of the syringe extends into the vial and is enclosed by a penetrable sleeve closure which seals the syringe into the neck of the vial in vapor-tight relationship, affording rigidity to the mounted assembly and preventing communication between the interiors of the syringe and vial.

The syringe is withdrawn from the vial and re-inserted through the wall of the penetrable sleeve closure intermediate its length to afford communication between the syringe and vial. Contents of the syringe are then expelled into the vial and the resulting mixture withdrawn into the syringe and the syring disengaged from the vial for use in the usual manner.

In the drawings, FIGURE 1 is a partial cross-section of a syringe and vial united in the manner described.

Figure 1:
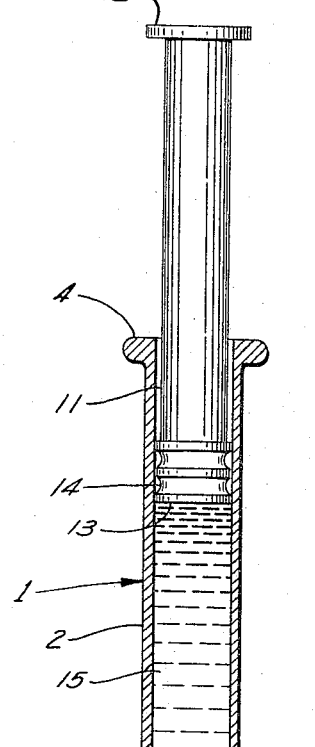
Figure 3:
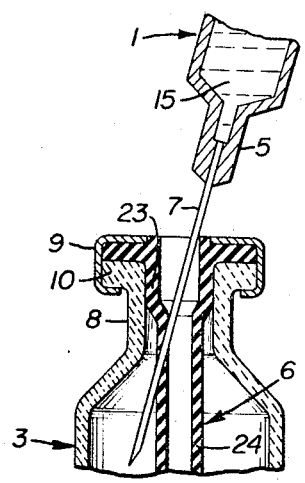
FIGURE 3 is a fragment of FIGURE 1 showing parts thereof in different positions of operation.

Referring more specifically to the drawings, it will be seen from FIGURE 1 that the barrel 2 of the syringe, designated generally as 1, is removably mounted atop the vial, designated generally as 3. Barrel 2 terminates at its upper end in finger-engageable collar 4 and at its lower end in boss 5. Penetrable sleeve closure, designated generally as 6, is adapted to receive cannula or needle 7 and boss 5 and to provide vapor-tight sealing engagement with neck 8 of vial 3 and boss 5. Over-seal 9 affords protection against accidentally dislodging sleeve closure 6 when withdrawing syringe 1 from vial 3. Plunger 11 with thumb-engageable flange 12 is slidably mounted in barrel 2 and terminates in piston 13. Annular recesses 14 in piston 13 improve the slidable and sealing engagement with the interior surface of barrel 2.

In use, syringe 1 is withdrawn from vial 3 and cannula 7 re-inserted into the body section 23 of sleeve closure 6 at an angle so that its tip pierces the side wall of the sleeve member 24 intermediate its length preferably as close to the body section 23 as possible. Depression of plunger 11 forces fluid 15 into vial 3, where it intermixes with medicament 16 therein. The resulting mixture is then withdrawn into syringe 1 for use in the usual manner.

Figure 2:
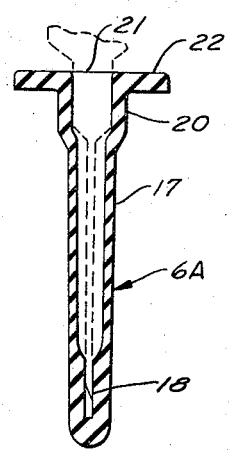
FIGURE 2 shows a cross-section of the penetrable sleeve closure for receiving the syringe and sealing the vial contents from the atmosphere.

FIGURE 2 shows an alternate penetrable sleeve closure 6A. Needle-penetrable, hollow, cannula-receiving member 17 terminates in formed section 18 having a reduced inside diameter, which is designed to afford a close fit about the lower portion or penetrating tip 25 of cannula 7 (FIGURE 1). While the configuration of the lower portion 19 of sleeve closure 6 shown in FIGURE 1 is generally acceptable, liquid from barrel 2 may, if conditions of surface tension are favorable, be drawn by capillary action into needle 7 and even into the well formed by the lower portion 19 of sleeve closure 6. For this reason formed section 18, fitting closely about the lower end of needle 7, is advantageously employed to minimize the space in sleeve 6A communicating with the cannula 7. Hollow, cylindrical body section 20 extends upward from cannula-receiving member 17 and is adapted to receive boss 5 in the cylindrical cavity 21 defined by body section 20 and to fit in vapor-tight relationship in neck 8 of vial 3. Flange 22 overlays lip 10 of vial 3 to facilitate sealing engagement of sleeve closure 6 in said vial 3.

Sleeve closure 6 or 6A as an integral unit performs three distinct functions. It provides positive separation of the cannula from the contents of the vial and from atmospheric contamination, whether such contents are liquid or solid, it imparts rigidity to the connection of the syringe mounted therein, and it affords a vapor-tight seal of the vial contents and the cannula against atmosphere contamination. The sleeve closure is fabricated of sterilizable materials such as high quality rubber or resilient plastic that will not impart chemical or particulate contamination to the individual or mixed ingredients of the assembled unit.

Figure 4:
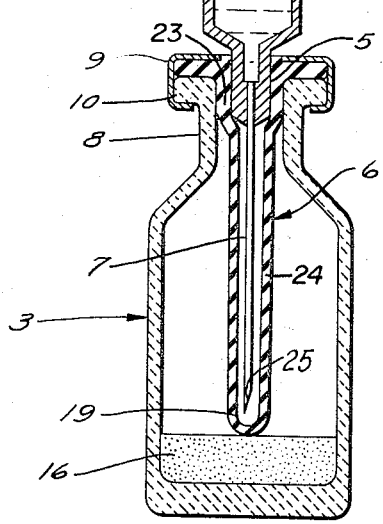
FIGURE 4 is a fragmentary showing of a modified construction.
Figure 4:
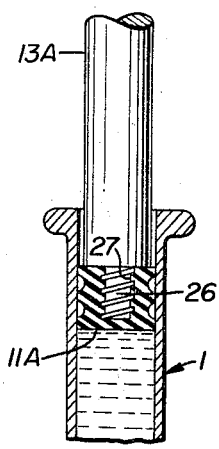

It is apparent that flange 22, as an integral part of sleeve closure 6, offers a convenient means for securing said closure to the vial. However, the flange is not an essential part of the closure and can be omitted in favor of other securing means or none at all, providing the depth of cylindrical body section 20 is such as by itself to afford substantially rigid connection with and support to the syringe and sufficient sealing surface with the vial neck.

Where it is desired to reduce the overall height of the package, plunger 11A (FIGURE 4) is provided at its lower end with a threaded plunger head 26 for threadable engagement with internal threads 27 of the piston 13A. The plunger can then be disengaged from the piston and maintained separate until use.

A particularly desirable feature of the present device is the ease with which it can be filled under aseptic conditions. All parts and ingredients are rendered sterile, and the solid or liquid medicament is charged to the vial, the sleeve closure inserted therein, and the overseal applied. The syringe, with piston and plunger removed, is mounted in the vial, the cannula depending fully into the sleeve closure. Liquid diluent or medicament is charged to the barrel and the syringe then assembled with no vapor space remaining above the liquid. It is apparent that other sequences can be employed, but the important aspect to be noted is the freedom from difficult assembly problems encountered here which commends this device to conventional manufacturing techniques.

What is claimed is:

1. In a device for mixing two sterile ingredients, at least one of which is a liquid, and thereafter for injecting said liquid, said device including a vial having a flanged neck and a syringe having a barrel and a cannula extending from a reduced portion at one end of the barrel, an adapter comprising:

an elongated and laterally penetrable sleeve impervious to said liquid and having an inside diameter slightly larger than the outside diameter of the cannula and having an inside lenugth substantially longer than the length of said cannula extending from said syringe, said sleeve being closed at its lower end and having a portion near its upper end removably receiving and firmly holding the reduced portion of the barrel when the cannula is spaced from said closed end, said upper end portion of said sleeve being snugly and sealingly received into the neck of the vial;

integral and annular flange means extending radially outwardly from the upper end portion of said sleeve and overlying and sealingly engaging the flange on the neck, said neck flange and said annular flange means being substantially coextensive; and annular overseal means having integral, axially spaced and radially inwardly extending flange members respectively engaging the flange means on said sleeve and said neck flange for holding same snugly together, said reduced portion of said barrel being adapted for withdrawl from within the enlarged upper end portion of said sleeve and said cannula being adapted for insertion through the side wall of said sleeve adjacent said neck for the purpose of discharging a liquid into said vial and thereafter withdrawing said liquid from said vial for injection by said syringe.

2. In a device for mixing two sterile ingredients, at least one of which is a liquid, and thereafter for injecting said liquid, said device including a vial having a flanged neck and a syringe having a barrel and a cannula extending from a reduced portion at one end of the barrel, an adapter comprising:

an elongated and laterally penetrable sleeve impervious to said liquid and having an inside diameter slightly larger than the outside diameter of the cannula and having an inside length substantially longer than the length of said cannula extending from the syringe, said sleeve being closed at its lower end and having a portion near its upper end of enlarged inside and outside diameters removably receiving and firmly holding the reduced portion of the barrel and, at the same time, being snugly and sealingly received into the neck of the vial, said sleeve having a lower end portion of reduced inside diameter adjacent the closed end thereof, the lower end of said cannula being snugly and removably disposed within said lower end portion and spaced from the closed end thereof when said reduced portion of said barrel is firmly held in said upper end portion of said sleeve;

integral and annular flange means extending radially outwardly from the upper end portion of said sleeve overlying and sealingly engaging the flange on the neck, said neck flange and said annular flange means being substantially coextensive; and substantially rigid and annular overseal means having integral, axially spaced and radially inwardly extending flange members respectively engaging the flange means on said sleeve and said neck flange for holding same snugly together, said reduced portion of said barrel being adapted for withdrawal from within the enlarged upper portion of said sleeve and said cannula being adapted for insertion through the side wall of said sleeve adjacent said neck for the purpose of discharging a liquid into said vial and thereafter withdrawing said liquid from said vial for injection by said syringe.

References Cited

UNITED STATES PATENTS

| | | | |
|---|---|---|---|
| 2,289,677 | 7/1942 | Perelson | 215—47 |
| 2,326,490 | 8/1943 | Perelson | 215—47 |
| 2,494,456 | 1/1950 | Still | 128—272 |
| 2,666,435 | 1/1954 | Ogle | 128—218 |
| 2,869,543 | 1/1959 | Ratcliff et al. | 128—218 |
| 2,872,924 | 2/1959 | Salisbury | 128—272 X |

RICHARD A. GAUDET, *Primary Examiner.*

D. L. TRULUCK, *Examiner.*